(12) United States Patent
Sarmiento Garcia

(10) Patent No.: US 9,398,763 B2
(45) Date of Patent: Jul. 26, 2016

(54) TWO-SPEED FISHING REEL

(71) Applicants: Bernardo Melian Correa, Las Palmas de Gran Canaria (ES); Miguel Godoy Sosa, Las Palmas de Gran Canaria (ES); Ana Isidra Godoy Sosa, Las Palmas de Gran Canaria (ES)

(72) Inventor: Manuel Roque Sarmiento Garcia, Las Palmas de Gran Canaria (ES)

(73) Assignees: Bernardo Melian Correa, Las Palmas de Gran Canaria (ES); Miguel Godoy Sosa, Las Palmas de Gran Canaria (ES); Ana Isidra Godoy Sosa, Las Palmas de Gran Canaria (ES)

( * ) Notice: Subject to any disclaimer, the term of this patent is extended or adjusted under 35 U.S.C. 154(b) by 0 days.

(21) Appl. No.: 14/510,461

(22) Filed: Oct. 9, 2014

(65) Prior Publication Data

US 2015/0189864 A1    Jul. 9, 2015

(30) Foreign Application Priority Data

Jan. 7, 2014   (ES) .............................. 201430015 U
Sep. 26, 2014  (EP) .................................... 14382365

(51) Int. Cl.
*A01K 89/01*   (2006.01)

(52) U.S. Cl.
CPC ................................. *A01K 89/0105* (2013.01)

(58) Field of Classification Search
CPC ............. A01K 89/01; A01K 89/0105; A01K 89/0184; A01K 89/0186; A01K 89/0188; A01K 89/0192
See application file for complete search history.

(56) References Cited

U.S. PATENT DOCUMENTS

| | | | | |
|---|---|---|---|---|
| 3,600,964 A | * | 8/1971 | Sarah ................. | A01K 89/0105 242/255 |
| 3,675,502 A | * | 7/1972 | Sarah ................. | A01K 89/0105 242/255 |
| 4,850,549 A | * | 7/1989 | Sakumoto .......... | A01K 89/0105 242/255 |
| 4,867,392 A | * | 9/1989 | Sato ..................... | A01K 89/033 192/48.91 |
| 4,966,335 A | * | 10/1990 | Kaneko ................ | A01K 89/015 242/255 |
| 2006/0016924 A1 | * | 1/2006 | Hirayama ............ | A01K 89/006 242/245 |
| 2009/0277984 A1 | * | 11/2009 | Wee ..................... | A01K 89/033 242/257 |
| 2011/0011966 A1 | * | 1/2011 | Takechi ............... | A01K 89/015 242/255 |
| 2011/0011967 A1 | * | 1/2011 | Takechi ............... | A01K 89/033 242/302 |

* cited by examiner

*Primary Examiner* — Emmanuel M Marcelo
(74) *Attorney, Agent, or Firm* — NSIP Law

(57) ABSTRACT

The present invention relates to a two-speed fishing reel which allows the choice of a higher or lower speed when reeling in or pulling out the fishing line, while keeping constant the rotation speed of the handle driving the reel operation.
That is possible because the fishing reel features two kinematic chains, which, by means of a knob, allow choosing one or the other, and due to the diameter and number of cogs of each one of the gears of these kinematic chains, the rotation speed of the rotor increases or decreases, at the same rotation speed of the handle.

8 Claims, 2 Drawing Sheets

TWO-SPEED FISHING REEL

CROSS-REFERENCE TO RELATED APPLICATION(S)

This application claims the benefit under 35 USC 119(a) of Spanish Patent Application No. 2014-30015, filed on Jan. 7, 2014, in the Spanish Intellectual Property Office, and European Patent Application No. 14382365, filed Sep. 26, 2014, in the European Intellectual Property Office, the entire disclosures of which are incorporated herein by reference for all purposes.

OBJECT OF THE INVENTION

The object of the present invention is a fishing reel of the type being coupled to the fishing rod, in order to reel in or pull out the fishing line or thread, which allows the choice of a higher or lower speed when reeling in or pulling out the fishing line, while keeping constant the rotation speed of the handle driving the reel.

BACKGROUND OF THE INVENTION

Fishing reels which are coupled to the fishing rods intended for sport use or for industrial fishing are well known in the art, said reels comprising a housing used as a frame where the other elements making up said fishing reel are coupled to.

A fishing reel is made up of a driving element, usually a handle, which actuates a series of cogwheels engaged to each other rotating the rotor that winds up the fishing line in the line spool; the line spool does not rotate with respect to its axis and, usually, it features a reciprocating movement relative to its axis that is synchronized with the rotation of the rotor, so as to provide a smooth winding of the line and prevent the line from tangling; a drag, which prevents the line from unwinding, is another one of devices which the current reels incorporate.

The set of cogwheels incorporated in the current reels is usually designed so that a turn of the handle makes the rotor rotate between 4.5 and 6 turns, that is: there are reels with a ratio ranging between 4.5 and 6, some are around 5:1 and others, more specialized ones, around 4:1 or 6:1, depending on the use to which they are intended. If a "strong action" reel is required, then a reel featuring a ratio between 4.5:1 and 5:1 would be chosen; if, on the contrary, the reel is intended for "light" fishing, one featuring a ratio above 5:1 should be preferred. Obviously, if, during the fishing action, a fish pulling too hard is to be "played", it is advantageous that the reel features a low ratio, whereas if, on the contrary, the fishing line is being reeled in with no catch, or if the fish swims towards the fisher, a high ratio is preferred in order to reel the line in the fastest possible.

The two-speed fishing reel disclosed solves the above problem in a simple and inexpensive way, providing a reliable technical solution during use.

DESCRIPTION OF THE INVENTION

The two-speed fishing reel object of the present invention, of the type described above, comprise:
   a housing used as a frame where the rest of elements are coupled to;
   a handle used as a driving element;
   a device transmitting the rotational movement of the handle to the rotor and which in turn comprises
      a gear A mounted on the first axis, in such a way that the axial position thereof is fixed and allows its rotation with respect to said first axis;
      a gear B mounted on the first axis, in such a way that the axial position thereof is fixed and allows its rotation with respect to said first axis;
      a gear C mounted on the second axis integrally;
      a gear E mounted on the second axis integrally;
      a gear E suitable to engage gear B;
      a spacer washer mounted on the first axis between gear A and gear B;
      a locking piece for gear A or gear B, said locking piece being mounted on the first axis in such a way that it can axially move between gear A position and gear B position, and that when it is in the gear A position it makes said gear A integral to the first axis rotation and when it is in the position of gear B it makes said gear be integral to the first axis;
      a knob coupled to the free end of the first axis that, when not being pressed, makes gear A be integral to the first axis, and when being pressed, the knob axially pushes the locking piece from the gear A position to the gear B position, making gear B be integral with respect to the first axis, and being gear A only axially fixed to said first axis;
      a first axis integrally attached at one of its ends to the handle, in such a way that the longitudinal axis thereof coincides with the handle rotation axis.

The aforementioned description creates two kinematic chains; the first chain operates when the knob is not activated and consists of gear A and gear C; the second kinematic chain operates when the knob is activated and has displaced the locking piece, and it consists of gear B and gear E and, due to the diameter and cogs of each one of the gears, this second kinematic chain increases the rotation speed of the rotor with respect to the rotation speed of the first kinematic chain at the same rotation speed of the handle.

In a preferred embodiment, and in order to provide the reel with more robustness, gear C and gear D are cut in the second axis.

In a second preferred embodiment the washer is of a plastic material.

LIST OF REFERENCES

1) First axis
2) Second axis
3) Knob
4) Gear A
5) Gear B
6) Washer
7) Gear C
8) Gear E
9) Locking piece

PREFERRED EMBODIMENT OF THE INVENTION

Figure 1:
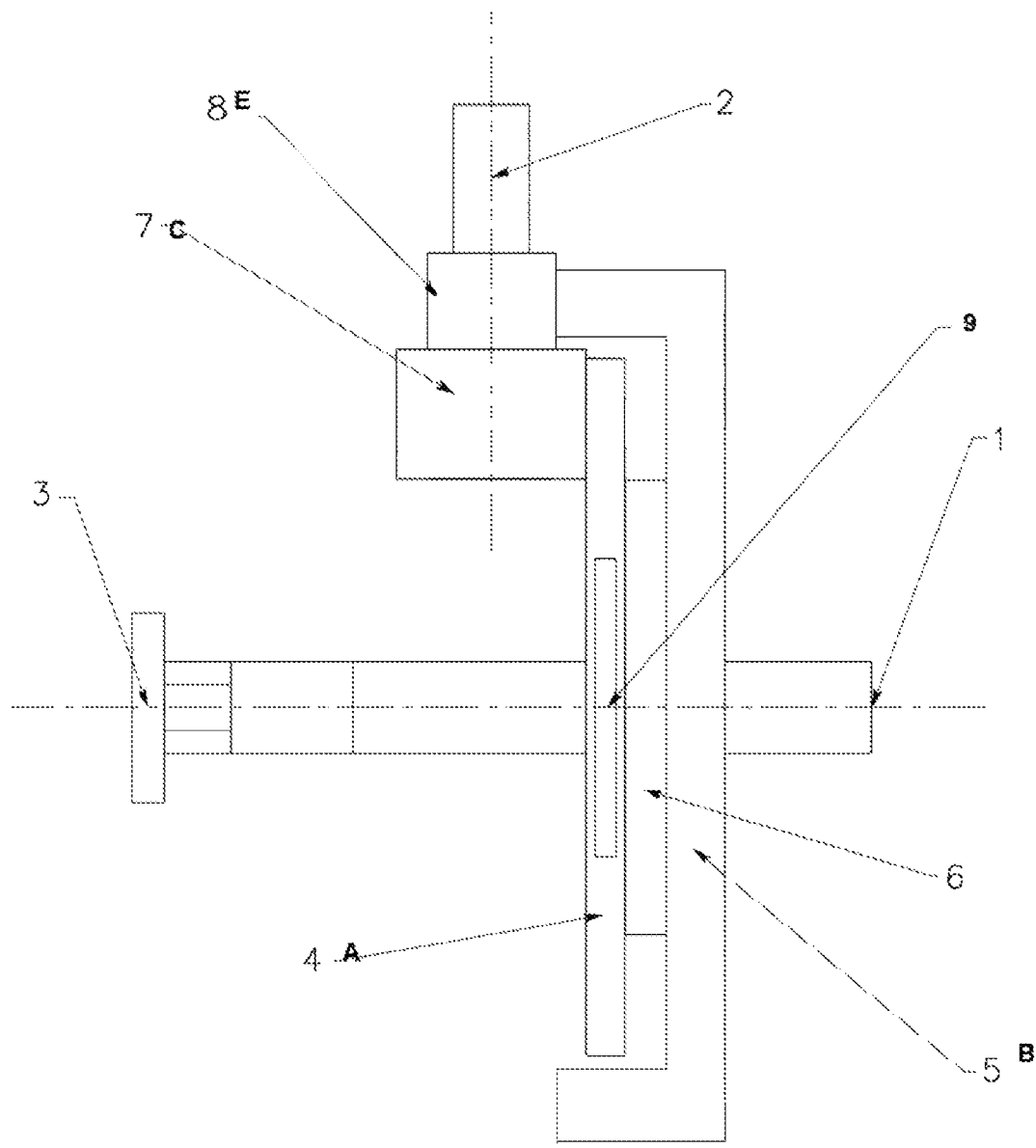
FIG. 1: schematic elevation view of the device
Figure 2:
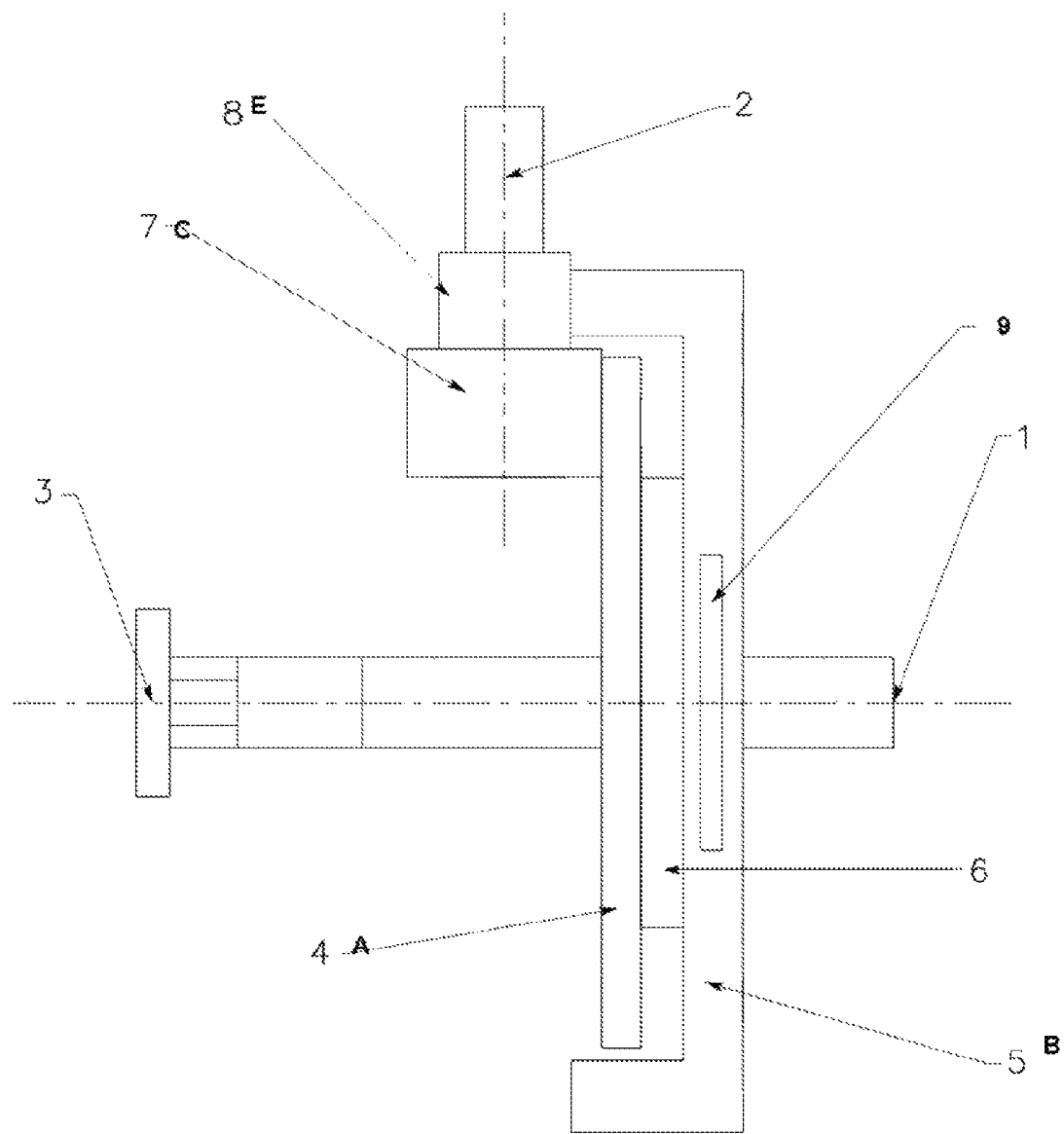
FIG. 2: schematic elevation view of the device showing the knob when it is activated

FIGS. 1 and 2 show a preferred embodiment of the invention. FIG. 1 shows the gears arrangement when the knob (3) is not activated, and the locking piece (9) is in the position of gear A (4) and it makes said gear A (4) be integral to the rotation of said first axis (1); and FIG. 2 shows the gears arrangement when the knob (3) is activated and it has axially displaced the locking piece (9), from the position of gear A (4) to the position of gear B (5), making said gear B (5) be integral to the first axis. To make sure that at no time the locking piece 9 makes both gear A (4) and gear B (5) be integral with the first axis (1) at the same time, the washer (6) is placed between said gears.

When the handle, which actuates the reel and is coupled to the first axis (1), is rotated its rotational movement is transmitted by means of the invention to the reel rotor, being coupled to the second axis (2), which is in charge of winding the fishing line or thread in the line spool, which does not rotate. The spool may feature a reciprocating movement, synchronized with the rotation movement of the rotor, so as to provide a smooth winding and prevent the line from tangling.

When the knob (3) is not pressed or activated, the locking piece (9) is in the position of gear A (4), making it integral to the first axis (1); while in this inactivated position of the knob, gear B (5) may rotate freely with respect to the first axis (1), the kinematic chain is made up by gear A (4) and gear C (7) and thus a "strong action" reel would be provided.

When the knob is activated or pressed, this axially pushes the locking piece (9) from gear A (4) position to gear B (5) position, and gear B (5) by means of the locking piece (9) becomes integral to the first axis (1) and gear A (4) may freely rotate with respect to the first axis (1), so, thus, the kinematic chain is made up by gear B (5), and gear E (8) which is mounted on the second axis (2), and a "light action" reel would be provided.

A person skilled in the art would be able to determine the suitable type of gearing for each one of the represented gears.

The invention claimed is:

1. A two-speed fishing reel, comprising:
   a housing;
   a handle configured to be coupled to the housing and rotatable about a first axis disposed orthogonally to a second axis of the reel; and
   a device configured to be operatively coupled to the handle to transmit rotation of the handle to a rotor of the reel, the device comprising:
   a first gear configured to be axially fixed along and rotatable about the first axis;
   a second gear configured to be axially fixed along and rotatable about the first axis;
   a third gear disposed about the second axis and configured to be couplable to the first gear;
   a fourth gear disposed about the second axis and configured to be couplable to the second gear;
   a spacer disposed between the first and second gears and configured to separate actuation therebetween;
   a lock configured to lockably engage respective pairs of the gears; and
   a knob configured to actuate the lock about the first axis to separably couple the pairs of the gears to the handle for rotation in accordance with rotation of the handle.

2. The two-speed fishing reel according to claim 1, wherein the second and fourth gears are disposed about the second axis.

3. The two-speed fishing reel according to claim 1, wherein the knob is configured to be switchable between a first position in which the first and third gears rotate in accordance with rotation of the handle, and a second position in which the second and fourth gears rotate in accordance with rotation of the handle.

4. The two-speed fishing reel according to claim 3, wherein, in response to switching of the knob, the lock moves axially along the first axis.

5. The two-speed fishing reel according to claim 4, wherein the spacer comprises a washer.

6. The two-speed fishing reel according to claim 1, wherein the lock engages the handle to attach the first gear or the second gear thereto.

7. The two-speed fishing reel according to claim 6, wherein the first gear circumscribes the lock, and the second gear circumscribes the lock.

8. The two-speed fishing reel according to claim 1, wherein the first gear circumscribes the lock, and the second gear circumscribes the lock.

* * * * *